United States Patent [19]

Orsini

[11] 4,362,975
[45] Dec. 7, 1982

[54] DEVICE FOR CONTROLLING A BIDIRECTIONAL DC MOTOR

[75] Inventor: Jean-Vitus Orsini, Marignier, France

[73] Assignee: Etablissements Carpano & Pons, France

[21] Appl. No.: 199,570

[22] Filed: Oct. 22, 1980

[30] Foreign Application Priority Data

Nov. 14, 1979 [FR] France ............... 79 28508

[51] Int. Cl.³ .............................................. H02P 1/00
[52] U.S. Cl. ...................................... 318/293; 318/5; 318/273
[58] Field of Search ................ 318/57, 261, 273, 280, 318/371, 372, 739, 741, 757, 293, 266, 468

[56] References Cited

U.S. PATENT DOCUMENTS

| | | | |
|---|---|---|---|
| 2,628,321 | 2/1953 | Anderson | 318/372 X |
| 2,833,975 | 5/1958 | Currie | 318/372 X |
| 2,912,632 | 11/1959 | Turtil | 318/293 X |
| 3,045,166 | 7/1962 | Robinson | 318/372 X |
| 3,842,329 | 10/1974 | Mierendorf | 318/372 |

*Primary Examiner*—Ulysses Weldon
*Attorney, Agent, or Firm*—Robert E. Burns; Emmanuel J. Lobato; Bruce L. Adams

[57] ABSTRACT

This device for controlling the operation of a bidirectional DC motor comprises a pair of double-throw control reversing switches and a pair of ON-OFF switches, a solenoid-operated brake associated with the motor shaft, and two pairs of unidirectional elements consisting of diodes. The cathode or anode of each diode is connected directly to the common terminal of each control reversing switch associated therewith and the brake solenoid is connected in parallel with the motor induction windings. The terminals of the brake solenoid are disposed between the motor windings and one of the ON-OFF switches so that the brake is applied as long as its solenoid is deenergized.

2 Claims, 5 Drawing Figures

DEVICE FOR CONTROLLING A BIDIRECTIONAL DC MOTOR

BACKGROUND OF THE INVENTION

The present invention is directed to provide an improved device for controlling a DC motor for operation on both directions of rotation.

A device of this type comprises first and second control reversing switches for controlling the motor rotation in a first direction and in a second direction of rotation, respectively, each one of said reversing switches being inserted in one of the two conductors supplying current to the motor. These switches have their common terminals disposed on the side of the two motor terminals, respectively, and their first and second terminals coupled to the positive and negative terminals, respectively, of the current source. This control device further comprises first and second ON-OFF switches adapted to stop the motor when the latter rotates in the first and second directions of rotation, respectively, each ON-OFF switch being connected in series to one of said control reversing switches, respectively, between the corresponding reversing switch and the motor, and two unidirectional starting elements each connected in parallel to one of said ON-OFF switches, the anode and cathode of each unidirectional starting element being located adjacent the motor. In addition, both ON-OFF swtiches consist of reversing switches comprising each a common terminal connected directly to the motor, a first terminal connected to the common terminal of the control reversing switch connected in series to said ON-OFF switch, and a second terminal connected to the common terminal of the other ON-OFF switch of the pair via a unidirectional stopping element. Finally, the cathode, or the anode, of each unidirectional stopping element is connected to the common terminal of the other ON-OFF switch when the anode, or the cathode, of the unidirectional starting element is disposed on the motor side.

Such device is disclosed in the U.S. Pat. No. 2,912,632 and further comprises resistors in series with diodes interconnecting the reversing switches. The possibility of stopping the motor suddenly and instantaneously is not contemplated; only a slow-down action for dissipating the current is provided. Moreover, when the single control reversing switch is actuated, the motor is not braked, and this may constitute a source of serious troubles.

SUMMARY OF THE INVENTION

The control device of this invention is characterized in that the control reversing switches are of the double throw type adapted to be actuated separately, that the cathode or the anode of each unidirectional stopping element is connected directly to the common terminal of each reversing switch, and that this control device further comprises a solenoid-operated brake having its solenoid connected in parallel to the motor induction winding, each one of the pair of terminals of the solenoid being disposed between the motor and one of the ON-OFF switches, said brake being adapted to brake the motor when the solenoid is deenergized.

A typical form of embodiment of the control device of this invention will now be described by way of example with reference to the accompanying drawings.

IN THE DRAWINGS

FIGS. 1 to 4 are circuit diagrams illustrating diagrammatically the specific form of embodiment of the control device shown in various phases of its operation, and FIG. 5 is a circuit diagram illustrating the same form of embodiment but with a modified diode arrangement.

DESCRIPTION OF THE PREFERRED EMBODIMENT

Figure 1:
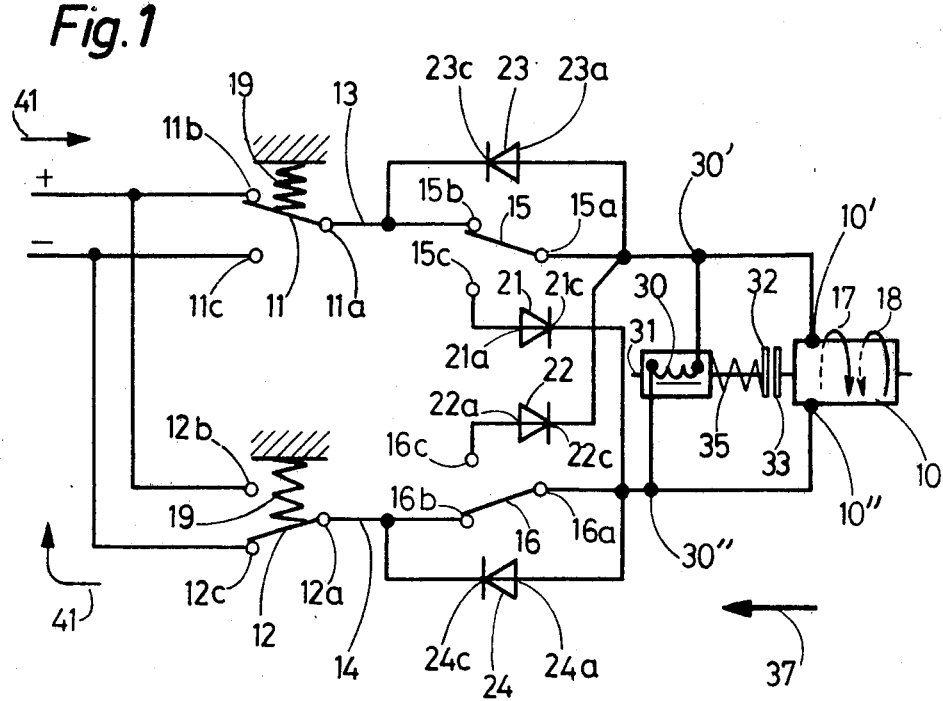

As illustrated diagrammatically in FIGS. 1 to 4 of the drawings, the control device for a DC bidirectional motor according to the present invention comprises in fact a DC motor 10 associated with a pair of separate control reversing switches 11 and 12 adapted to control the rotation of said motor 10 in a first direction 17 and in another direction 18, respectively. Each switch, 11,12 is inserted in one of the current supply conductors 13,14, respectively, of motor 10. These control reversing switches 11,12 are of the double-throw type and operable separately. Each switch 11,12 comprises on the one hand a common terminal 11a, 12a, respectively, on the motor side, and on the other hand a first control terminal 11b, 12b, respectively, connected to the positive terminal + of the DC supply source, and a second control terminal 11c, 12c, respectively, connected to the negative terminal − of the same source. In this exemplary form of embodiment, the control switches 11,12 are designed for manual actuation, but it will readily occur to those conversant with the art that automatic switch control means responsive to an external factor such as: wind speed variations, sun light variations, etc, may be used. When inoperative, these control switches 11 and 12 are urged by compression springs 19 to the position shown in FIG. 2, in which the switch contacts are closed at 11a-11c, 12a-12c, and open at 11a-11b and 12a-12b, respectively.

The control device of this invention further comprises a pair of ON-OFF switches consisting in fact of reversing switches 15 and 16. ON-OFF switch 15 is connected in series to control switch 11, between this switch 11 and the motor 10. The other ON-OFF switch or reversing switch 16 is connected in series to control switch 12, between this switch and the motor 10. The ON-OFF switch 15 is so arranged and connected that when open it stops the motor 10 if the latter rotates for example in direction 17. The other ON-OFF switch 16 is so arranged and connected that when open it stops the motor 10 if the latter rotates in direction 18.

Two unidirectional starting elements consisting, in this example, of a pair of diodes 23 and 24, are connected in parallel to the two ON-OFF switches 15 and 16, respectively. These diodes are arranged to prevent the current from flowing in the direction corresponding to the direction of rotation of the motor, which previously opened the corresponding ON-OFF switches 15 or 16. Thus, the cathode 23c of diode 23 is disposed on the side of the common terminal 11a, and the corresponding anode 23a is on the side of motor 10 (FIG. 1). Similarly, the cathode 24c of diode 24 is disposed on the side of common terminal 12a, and the corresponding anode 24a is disposed on the side of motor 10 (FIG. 1).

The two ON-OFF switches 15 and 16 comprise each a common terminal 15a, 16a, respectively, connected directly to the motor 10. The first ON-OFF switch 15 further comprises a first terminal 15b connected to the common terminal 11a of the corresponding control reversing switch 11, and a second terminal 15c connected to the common terminal 16a of the other ON-OFF switch 16 via a unidirectional stop element consisting of a so-called stop diode 21. This stop diode 21 comprises an anode 21a connected with terminal 15c of switch 15 and a cathode 21c connected to the common terminal 16a of the other ON-OFF switch 16. In a similar fashion, this switch 16 comprises a first terminal 16b connected to the common terminal 12a of the corresponding control switch 12, and a second terminal 16c connected to the common terminal 15a of the other ON-OFF switch 15, via a unidirectional stop element consisting of another stop diode 22. This stop diode 22 comprises an anode 22a connected with terminal 16c of switch 16 and a cathode 22c connected to the common terminal 15a of the other ON-OFF switch 15.

The control device according to this invention also comprises a brake adapted to exert a braking force on the motor 10 when the supply of energizing current to this motor 10 is discontinued for any reason. This brake comprises a solenoid 30 connected in parallel to the motor induction winding 10. The solenoid terminals 30',30'' are inserted between the motor 10 and the ON-OFF switches 15,16, respectively, more particularly between the motor 10 and the common terminals 15a, 16a, respectively, of said ON-OFF switches. This solenoid is adapted to control the axial stroke of a plunger core 31 rigidly connected at one end to a first brake disc 32 adapted to cooperate with a second brake disc 33 supported by the motor shaft 34 disposed coaxially to the plunger core 31. The cross-sectional configuration of this core 31 is designed to prevent the rotation thereof. A compression spring 35 surrounding the core 31 in this example, between the solenoid 30 and the first brake disc 32, constantly urges the first brake disc 32 towards the second brake disc 33 as shown by the arrow 36. This is the position of the brake discs 32,33 when the solenoid is deenergized, so that the motor 10 is braked through its shaft 34. When the solenoid 30 is energized, the first brake disc 32 is moved away from the second brake disc 33, against the force of spring 35, as shown by the arrow 37, and the motor shaft 34 is released.

Figure 2:
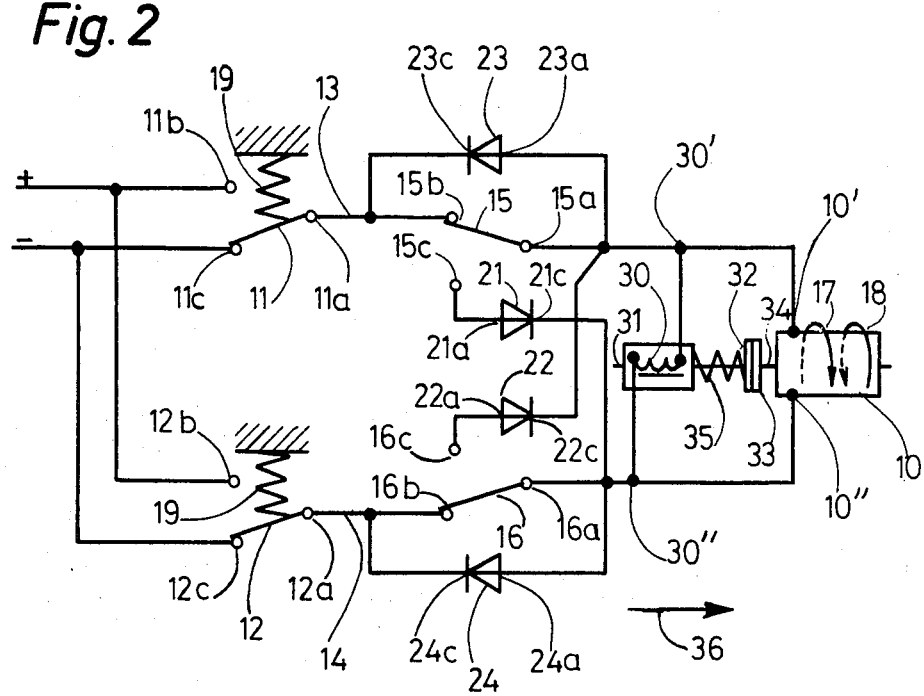

Assuming that when inoperative the various reversing switches are in the respective positions shown in FIG. 2, the ON-OFF switches 15 and 16 are closed at contacts 15a–15b and 16a–16b, respectively, and therefore open at contacts 15a–15c and 16a–16c, respectively. The control reversing switches 11 and 12 are open at 11a–11b and 12a–12b, respectively, and closed at 11a–11c and 12a–12c, respectively. The motor winding and the solenoid are short-circuited at the negative terminal. The motor 10 is deenergized and stopped. Since no current flows through the solenoid 30, the spring 35 continues to press the first brake disc 32 against the second brake disc 33. The brake will thus operate and hold the shaft 34 of motor 10 against rotation, even if a torque tending to cause this rotation were applied to said shaft.

If the reversing switch 11 were actuated for instance manually against the force of spring 19, so as to close contacts 11a–11b, and open contacts 11a–11c, as illustrated in FIG. 1, current would flow as shown by the arrow 41 from the positive terminal + to the negative terminal − of the source of current, whereby the motor 10 would be energized to rotate in direction 17. Since the solenoid 30 is also energized, the first brake disc 32 is attracted and therefore spaced from the second brake disc 33 against the force of spring 35. Thus, the brake is released and the motor shaft 34 can rotate freely in said direction 17.

Now if the reversing switch 11 is released, the various component elements of the device will resume their previous positions (FIG. 2). Since motor 10 is deenergized, a first braking torque is applied instantaneously thereto, the motor rotor being shorted at the negative terminal − of the current supply source. Simultaneously, the solenoid 30 is deenergized and thus the first brake disc 32 is urged by spring 35 against the second brake disc 33. Even if this spring 35 is relatively weak, the braking torque exerted by the first brake disc 32 adds itself to the torque of motor 10, so that the latter is stopped instantaneously, even if at the same time its shaft 34 receives a torque tending to rotate this shaft in direction 17. This is observed for instance in case a kinematic coupling were provided between this shaft 34 and the winding shaft of a relatively heavy rolling shutter.

If the control reversing switch 11 is actuated again as described hereinabove, the motor 10 will start again in the direction 17. If it is the other control switch 12 that is actuated against the force of its return spring 19, the motor 10 will start again but in the reverse direction 18. It will be seen that in both cases the diodes 21,22,23 and 24 are inoperative as long as only reversing switches 11 and 12 are actuated.

Figure 3:
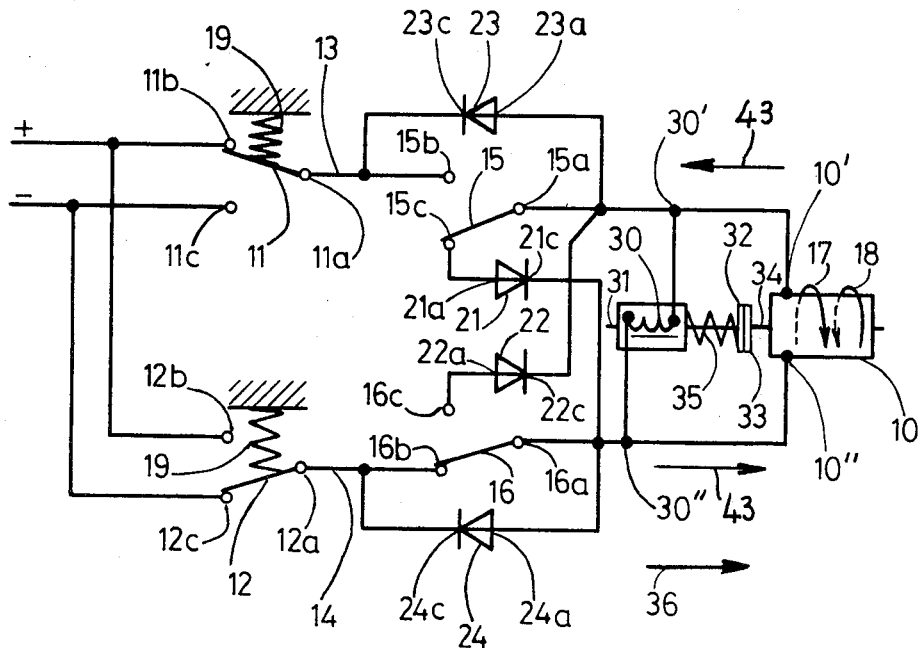

FIG. 3 illustrates the positions of the various component elements of the control device of this invention in case the reversing switches 15 were actuated automatically to open contacts 15a–15b and close contacts 15a–15c during the holding of control switch 11 in its closed condition at 11a–11b. This actuation takes place for instance when the member driven by the motor shaft 34 (for example a rolling shutter or a roller blind, not shown in the drawings) has completed its predetermined movement, and is for instance fully unrolled. When the switch 15 is thus closed at 15a–15c, the motor 10 and solenoid 30 are shorted via contacts 15a–15c and diode 21. In this event the motor 10 operates as a generator and the current produced thereby flows in the direction of the arrow 43 (i.e. opposite the previous direction 41) through the now closed switch contacts 15a–15c and diode 21. The cathode and anode of this diode 21 are so directed that this diode, having a very low impedance, permits the very easy passage of current through it, instead of energizing the solenoid 30 which in this case would prevent a braking action from being applied to the motor shaft 34. On the other hand, though diode 23 is connected in parallel with the ON-OFF switch 15, it cannot energize the motor 10 and solenoid 30 since it is not conductive, its cathode 23c being directed at that time towards the positive terminal + of the current source.

With motor 10 this stopped, the other control switch 11 can be released and thus allowed to resume its inoperative position (FIG. 2). If this other control switch 11 is actuated again to close its contacts 11a–11b, the motor 10 will remain stationary due to the action of diode 21 and 23, as already explained hereinabove.

Figure 4:
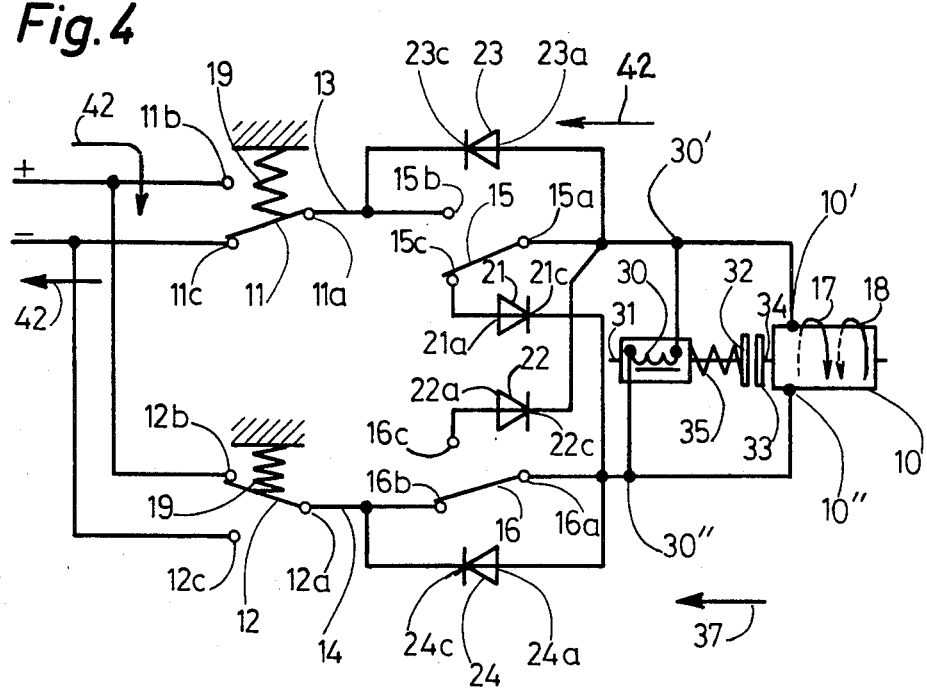

In contrast thereto, if the other control switch 12 is actuated to close contacts 12a–12c while opening contacts 12a–12b, as shown in FIG. 4, current will flow instantaneously in the direction of the arrow 42 (FIG. 4) from the positive terminal + to the negative terminal −. The diode 23, as a consequence of its new direction of current supply, will thus become conductive and permit the passage of current in said direction 42. The cathode 21c of diode 21 being directed towards the + terminal is non-conductive and prevents the short-circuiting of the current source via the circuit comprising the common terminal 16a, the ON-OFF switch 15 closed at 15a–15c, the diode 33 and the common terminal 11a. The solenoid 30 is thus energized, the brake released and the motor 10 free to rotate in the opposite direction, i.e. as shown by the arrow 18. When the motor 10 has accomplished a predetermined rotation to move the member driven thereby as contemplated, the automatic ON-OFF switch 15 recloses its contacts 15a–15b, and thus the diode 23 is short-circuited. At the same time, contacts 15a–15c are opened.

Now if control switch 12 is kept closed at 12a–12b until the motor 10 has driven during its rotation in direction 18 the member coupled to its shaft 34, for instance a rolling shutter, to its fully wound position, the automatic ON-OFF switch 16 will close its contacts 16a–16c to short-circuit the motor 10 and solenoid 30, the cathode 24c of diode 24 being directed towards the positive terminal + of the current source, thus causing this diode to become non-conductive in turn while preventing the energization of motor 10 from taking place through said diode 24.

In a manner similar to the above-disclosed mode of operation, only a re-actuation of reversing control switch 11 to reclose its contacts 11a–11b will enable the motor 10 to start in a direction oppostie the preceding direction of rotation, i.e. in the direction of the arrow 17, the diode 24 permitting the passage of current in the direction opposed to 42, and on the other hand the diode 22 having its cathode 22c directed towards the positive terminal + will prevent the current supply from being short-circuited through switch 16 closed at 16a–16c, and diode 24.

Figure 5:
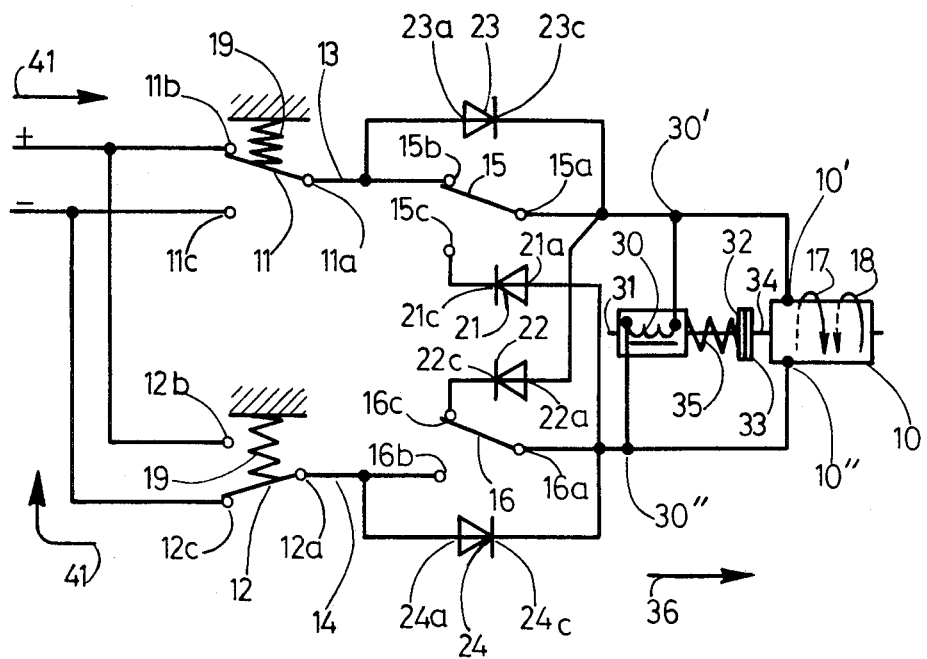

In the modified form of embodiment illustrated diagrammatically in FIG. 5, the dcirections of the cathodes and anodes of diodes 21 to 24 are reversed. The ON-OFF switch 16 and diodes 22 and 24 associated therewith cooperate to stop the rotation of motor 10 when this rotation takes place in the direction of the arrow 17, and the other ON-OFF switch 15 and the diodes 21,23 associated therewith cooperate to stop the rotation of motor 10 when it takes place in the other direction 18. Thus, the anode 22a of stop diode 22 is connected to the common terminal 15a of the other ON-OFF switch 15, and the cathode 23c of starting diode 23 corresponding to this other ON-OFF switch 15 is directed towards the motor 10 and coupled to the common terminal 15a.

If for instance the control reversing switch 11 were maintained with its contacts 11a–11b closed, to cause the motor 10 to rotate in direction 17, the subsequent closing of contacts 16a–16c of ON-OFF switch 16 would short-circuit the motor 10 and solenoid 30 via the stop diode 22. The terminals of this diode are so directed that the diode allows the passage, in a direction opposed to 41, of the current produced by the motor 10 then operating as a generator, for its cathode 24c is directed towards the positive terminal + of the current source. Therefore, the rotation of motor 10 in the direction 17 is stopped and the brake holds the motor against rotation.

If now the control switch 11 were released to close its contacts 11a–11c, and if the other control switch 12 were actuated to close its contacts 12a–12b, current would flow in the opposite direction through the now conducting starting diode 24 for this direction of current flow. Cathode 22c of diode 22 prevents the short-circuiting of the current source via the closed contacts 15a–15b of switch 15. Since the brake and motor are both energized, the motor rotates in direction 18 and keeps rotating when the ON-OFF switch 16 is closed automatically at 16a–16b.

The control device of this invention is particularly advantageous whenever it is required to stop accurately and instantaneously a direct-current motor. This control device is more particularly advantageous in case the electric motor controlled thereby is intended for driving a load or a roller blind, a rolling shutter, a garage door or other similar structures.

What is claimed is:

1. A device for controlling a reversible DC electric motor having first and second terminals comprising:
   current supply conductors having positive and negative terminals,
   a first control reversing switch having a common terminal, a first control terminal connected with the positive supply terminal, a second control terminal connected with the negative supply terminal, and a movable element movable between a first position in which it connects said common terminal with said first control terminal and a second position in which it connects said common terminal with said second control terminal,
   a first ON-OFF switch having a common terminal connected with a first terminal of said motor, a first control terminal connected with said common terminal of said first control reversing switch, a second control terminal, and a movable element movable between a first position in which it connects said common terminal with said first control terminal and a second position in which it connects said common terminal with said second control terminal,
   a first unidirectional element connected in parallel with said first ON-OFF switch with said movable element in said first position,
   a second control reversing switch having a common terminal, a first control terminal connected with the positive supply terminal, a second control terminal connected with the negative supply terminal, and a movable element movable between a first positionin which it connects said common terminal with said first control terminal and a second position in which it connects said common terminal with said second control terminal,
   a second ON-OFF switch having a common terminal connected with a second terminal of said motor, a first control terminal connected with said common terminal of said second control reversing switch, a second control terminal, and a movable element movable between a first position in which it connects said common terminals with said first control terminal and a second position in which it connects said common terminal with said second control terminal,
   a second unidirectional element connected in parallel with said second ON-OFF switch with said movable element in said first position
   a third unidirectional element connected between said second control terminal of said first ON-OFF switch and said common terminal of said second ON-OFF switch,
   a fourth unidirectional element connected between said second control terminal of said second ON- OFF switch and said common terminal of said first ON-OFF switch, means for braking said motor comprising a braking element biased to braking condition and a solenoid connected in parallel with said motor for moving said braking element to released condition when said solenoid is energized, said third and fourth unidirectional elements being directed and operable to short circuit said solenoid to prevent its being energized by reverse voltage generated by said motor when current from said current supply is switched off, said first and second control reversing switches being operable separtely and independently of one another, and means spring biasing said control reversing switches to positions in which said common terminals of both of said control reversing switches are connected with the same terminal of said supply conducters whereby no current is supplied to said motor.

2. A device according to claim 1, in which said unidirectional elements are diodes.

* * * * *